(12) United States Patent
Ruuska

(10) Patent No.: US 8,626,073 B2
(45) Date of Patent: Jan. 7, 2014

(54) USE OF MEASUREMENT PILOT FOR RADIO MEASUREMENT IN A WIRELESS NETWORK

(75) Inventor: Paivi M. Ruuska, Tampere (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 11/517,884

(22) Filed: Sep. 8, 2006

(65) Prior Publication Data

US 2007/0060067 A1    Mar. 15, 2007

Related U.S. Application Data

(60) Provisional application No. 60/715,836, filed on Sep. 9, 2005.

(51) Int. Cl.
*H04B 17/00*    (2006.01)
(52) U.S. Cl.
USPC ............... 455/67.11; 455/63.1; 455/67.13; 455/423; 455/522; 455/424; 370/330; 370/332
(58) Field of Classification Search
USPC .......... 455/67.11, 423, 424, 67.13, 63.1, 522, 455/436; 370/330, 310, 337, 332
See application file for complete search history.

(56) References Cited

U.S. PATENT DOCUMENTS

| 6,097,953 | A | * | 8/2000 | Bonta et al. ................. 455/436 |
| 6,144,855 | A | * | 11/2000 | Slovin ........................ 455/432.1 |
| 6,195,552 | B1 | * | 2/2001 | Jeong et al. .................. 455/436 |
| 6,636,738 | B1 | * | 10/2003 | Hayashi ....................... 455/450 |
| 6,754,191 | B1 | * | 6/2004 | Paranchych et al. .......... 370/331 |
| 6,768,908 | B1 | * | 7/2004 | Jalloul et al. ................. 455/442 |
| 6,810,236 | B2 | * | 10/2004 | Terry et al. ................. 455/67.11 |
| 6,816,730 | B2 | * | 11/2004 | Davies et al. ................. 455/436 |
| 6,873,611 | B2 | * | 3/2005 | Rios ............................. 370/338 |
| 6,940,843 | B2 | * | 9/2005 | Goodall et al. ............... 370/338 |
| 6,958,982 | B2 | * | 10/2005 | Rudolf et al. ................. 370/328 |
| 6,985,465 | B2 | * | 1/2006 | Cervello et al. .............. 370/333 |
| 6,990,428 | B1 | * | 1/2006 | Kaiser et al. ................. 702/150 |
| 7,120,392 | B2 | * | 10/2006 | Chu et al. ....................... 455/69 |
| 7,133,398 | B2 | * | 11/2006 | Allen et al. ................... 370/350 |

(Continued)

FOREIGN PATENT DOCUMENTS

| EP | 1473956 A2 | 11/2004 |
| TW | 95133112 | 6/2007 |

(Continued)

OTHER PUBLICATIONS

International Search Report and Written Opinion for corresponding application # PCT/IB2006/002476, (Feb. 15, 2007),12 Pgs.

(Continued)

*Primary Examiner* — Marceau Milord
(74) *Attorney, Agent, or Firm* — Harrington & Smith

(57) ABSTRACT

Various embodiments are disclosed relating to use of a measurement pilot for radio measurement in a wireless network, such as, for example, for use in the measurement and generation of beacon reports. In an example embodiment, a radio measurement request may be received from a requesting wireless node and a measurement pilot frame may be received from one or more wireless nodes. A radio measurement report may be generated based, at least in part, on the measurement pilot frame from one or more wireless nodes. The radio measurement report may be transmitted to the requesting wireless node.

21 Claims, 11 Drawing Sheets

(56) References Cited

U.S. PATENT DOCUMENTS

| | | | |
|---|---|---|---|
| 7,133,686 B2* | 11/2006 | Hundal et al. | 455/465 |
| 7,181,166 B2* | 2/2007 | Shimada et al. | 455/62 |
| 7,206,840 B2* | 4/2007 | Choi et al. | 709/225 |
| 7,286,835 B1* | 10/2007 | Dietrich et al. | 455/456.1 |
| 7,356,001 B1* | 4/2008 | Jones et al. | 370/331 |
| 7,372,898 B2* | 5/2008 | Shin et al. | 375/219 |
| 7,433,696 B2* | 10/2008 | Dietrich et al. | 455/456.2 |
| 7,440,757 B2* | 10/2008 | Kwon et al. | 455/436 |
| 7,460,512 B2* | 12/2008 | Goodall et al. | 370/338 |
| 7,472,027 B1* | 12/2008 | Batcher et al. | 702/60 |
| 7,505,441 B2* | 3/2009 | Backes et al. | 370/338 |
| 7,509,097 B2* | 3/2009 | Irie et al. | 455/67.13 |
| 7,525,915 B2* | 4/2009 | Zaki et al. | 370/235 |
| 7,593,367 B2* | 9/2009 | Amerga et al. | 370/332 |
| 7,647,046 B2* | 1/2010 | Huang et al. | 455/432.1 |
| 7,656,839 B2* | 2/2010 | Backes et al. | 370/331 |
| 7,676,216 B2* | 3/2010 | Stieglitz et al. | 455/410 |
| 7,710,930 B2* | 5/2010 | Kwak | 370/338 |
| 2002/0168944 A1 | 11/2002 | Terry et al. | |
| 2004/0039817 A1* | 2/2004 | Lee et al. | 709/225 |
| 2005/0128988 A1 | 6/2005 | Simpson | |
| 2005/0147041 A1* | 7/2005 | Zaki et al. | 370/235 |
| 2006/0218271 A1 | 9/2006 | Kasslin et al. | |
| 2006/0268756 A1* | 11/2006 | Wang et al. | 370/310 |

FOREIGN PATENT DOCUMENTS

| | | | |
|---|---|---|---|
| WO | 2004104737 | A2 | 12/2004 |
| WO | 2007029109 | A2 | 3/2007 |
| WO | 2007029109 | A3 | 3/2007 |

OTHER PUBLICATIONS

"Draft Amendment to Standard for Information Technology—Telecommunications and Information Exchange Between Systems—LAN/MAN Specific Requirements", IEEE P802.11k/D2.2, Part 11: Wireless Medium Access Control (MAC) and physical layer (PHY) specifications Amendment 9: Radio Resource Measurement,(Jul. 2005),1-138.

"Measurement Pilot Frame", IEEE 802.11-05/0176r0 https://mentor.ieee.org/802.11/file/05/11-05-0176-00-000k-measurement-pilot-frame-presentation.ppt, (Mar. 15, 2005).

Office Action received for Chinese Patent Application No. 200680031980.5, mailed on Dec. 26, 2011, 20 pages including 12 pages for the English Translation.

Office Action for Chinese Patent Application No. 200680031980.5 (with English Translation), mailed on Oct. 12, 2010, 18 pages.

Office Action for Vietnamese Patent Application No. 1-2008-00509 mailed on Apr. 29. 2008, 1 Pg.

Office Action for Singapore Patent Application No. 200801374-0 mailed on Jan. 22, 2009, 5 Pgs.

International Preliminary Report on Patentability for PCT Patent Application No. PCT/IB2006/002476 mailed on Mar. 20, 2008, 9 Pgs.

Office Action for Singapore Patent Application No. 200801374-0, mailed on Jan. 22, 2009, 5 pages.

Office Action for Vietnamese Patent Application No. 1-2008-00509, mailed on Apr. 29, 2008, 1 page.

International Preliminary Report on Patentibility for PCT Patent Application No. PCT/IB2006/002476, mailed on Mar. 20, 2008, 9 pages.

Office Action for Korean Patent Application No. 10-2008-7005043, mailed on Sep. 17, 2009, 17 pages.

Final Office Action for Korean Patent Application No. 10-2008-7005043, mailed on Mar. 23, 2010, Including English Translation, 6 pages.

Emeott, Steve, et al., "Measurement Pilot Frame", Motorola, Submission, IEEE 802.11-0510176r0, XP-003009938, Mar. 1, 2005, pp. 1-12.

Extended European Search Report received for the European Patent Application No. 06795451.1, mailed on Dec. 9, 2011, 8 pages.

Kwak, Joe, "Normative Text Changes for LB73 RCPI Comments", IEEE 802.11, Wireless LANs, IEEE 802.11-0510440r1, XP-002663936, Jul. 18, 2005, pp. 1-17.

Office Action for Mexican Patent Application No. MX/a/2008/002887, mailed on Sep. 29, 2011, 2 pages. (No English Translation available).

Ruuska, Paivi M., et al., "Beacon Measurement on Pilot Frames", IEEE 802.11, Wireless LANs, Nokia, IEEE 802.11-05/0948r0, XP002663938, Sep. 12, 2005, pp. 1-10.

Ruuska, Paivi M., et al., "Beacon Measurement on Pilot Frames", Nokia, IEEE, IEEE 802.11-05/0947r0, XP002663937, Sep. 19, 2005, pp. 1-6.

* cited by examiner

| Order | Information | Notes |
|---|---|---|
| 1 | Timestamp | |
| 2 | Measurement Pilot Interval | |
| 3 | Beacon Interval | |
| 4 | Capability Information | |
| 5 | RSN Capabilities | |
| 6 | Country String | |
| 7 | Max Regulatory Power | |
| 8 | Max Transmit Power | |
| 9 | Transmit Power Used | |
| 10 | Transceiver Noise Floor | |
| 11 | DS Parameter Set | The DS Parameter Set information element is present within Measurement Pilot frames generated by STAs using direct sequence PHYs. |

200

Measurement Pilot frame body

FIG. 2

| Channel Number | Regulatory Class | Randomization Interval | Measurement Duration | Measurement Mode |
|---|---|---|---|---|
| 1 | 1 | 2 | 2 | 1 |

Octets:

300

| BSSID | Reporting Condition | Threshold /Offset | Hysteresis |
|---|---|---|---|
| 6 | 1 | 1 | 1 |

Octets:

Measurement request field format for beacon request

FIG. 3

| Mode | Value |
|---|---|
| Passive | 0 |
| Active | 1 |
| Beacon table | 2 |
| Passive Pilot measurement | 3 |
| Passive including Pilot measurement | 4 |
| Any type | 5 |
| Reserved | 6-255 |

Measurement Mode definitions for Beacon Request element

FIG. 4a

| Mode | Value |
|---|---|
| Passive | 0 |
| Active | 1 |
| Beacon Table | 2 |
| Reserved | 3-255 |

Measurement Mode definitions for Beacon Request element

FIG. 4b

| Channel Number | Regulatory Class | Actual Measurement Start Time | Measurement Duration | PHY Type | RCPI | BSSID |
|---|---|---|---|---|---|---|
| 1 | 1 | 8 | 2 | 1 | 1 | 6 |

Octets:

| Parent TSF | Target TSF | Beacon Interval | Capability Information | Received Elements |
|---|---|---|---|---|
| 4 | 8 | 2 | 2 | variable |

Octets:

500

Measurement Report field format for beacon report

FIG. 5

USE OF MEASUREMENT PILOT FOR RADIO MEASUREMENT IN A WIRELESS NETWORK

CROSS-REFERENCE TO RELATED APPLICATIONS

This application claims priority to U.S. Provisional Application Ser. No. 60/715,836, filed on Sep. 9, 2005, entitled "Use of Measurement Pilot for Radio Measurement in a Wireless Network," hereby incorporated by reference.

BACKGROUND

Wireless networks, such as wireless local area networks (WLAN) typically communicate via radio or other frequencies. In a WLAN, for example, mobile stations are typically moving around, and may communicate with an access point (AP) or base station. The AP is typically a fixed device that may (or may not) be connected to infrastructure networks or wired networks.

The most common WLAN technology is described in the Institute of Electrical and Electronics Engineers IEEE 802.11 family of industry specifications, such as specifications for IEEE 802.11b, IEEE 802.11g and IEEE 802.11a. A group of 802.11 mobile stations may be in communication with each other (either directly or through one AP) in a network known as a basic service set (BSS), which may be identified by a basic service set identifier (BSSID). A group of BSSs (e.g., with one AP per BSS) may be coupled together in a larger WLAN network (e.g., with multiple APs) known as an extended service set (ESS), which may be identified by a service set ID (SSID).

When a mobile station moves around a wireless network (e.g., WLAN), the station may need to change its present association from one AP to another AP if the signal reception level of the presently associated (serving) AP becomes too low and/or another AP provides a better signal level or capabilities. This procedure is known as roaming, and allows a mobile station to switch association among APs.

Before roaming or associating with a new AP, a mobile station may first locate one or more APs. There are a number of known techniques for measuring or monitoring radio signals to allow roaming between APs. Signals transmitted by APs may generally be monitored, and the received signal strength (RSS) may be measured for each AP, for example. In particular, APs may be located, for example, via passive scanning and by active scanning.

In passive scanning, a wireless station may monitor one or more channels to determine if there is a beacon or probe response transmitted by APs. A beacon may be transmitted by each AP at regular intervals (known as beacon intervals), e.g., every 100 ms. A beacon (or beacon signal) may include, for example, an AP timestamp representing the value of the timing synchronization function (TSF) timer to keep the associated stations synchronized to the AP, a BSSID identifying a specific WLAN network, a traffic indication map (TIM), beacon interval (or amount of time between beacon transmissions), an indication of the supported data rates, parameter sets or information about specific signaling methods that are supported, capability information (such as whether Wired Equivalency Privacy or WEP protocol is supported), and other information. In passive scanning, a node may listen for beacons or probe responses on each of a plurality of channels, gathering information on each AP such as received signal strength, capabilities and data rates of the AP, etc. In some instances, passive scanning may expend time and power while listening for a beacon or probe response that may never occur or may be an idle channel.

Active scanning may involve a mobile station transmitting a probe request to one or more specific APs, and receiving probe responses from the APs. Active scanning allows mobile stations to interact with APs or other stations to obtain information. A mobile station may transmit, for example, a probe request that specifies a service set identity (SSID) in the probe request frame. Any AP or station on the channel that matches the SSID may, for example, respond with a probe response. The probe response, similar to a beacon, may provide information that may be useful to allow a station to access the network or associate with an AP. When compared to monitoring of beacons (passive scanning), active scanning may, in some cases, result in longer battery life (e.g., may consume less battery power), but also may reduce network capacity due to the probe request/probe response traffic.

It has also been recently proposed for APs to transmit measurement pilots (which sometimes may be referred to as gratuitous probe responses). An AP may typically transmit a measurement pilot frame much more frequently (e.g., every 10 ms) than a beacon (e.g., every 100 ms) to provide more frequent information to stations. Thus, because the measurement pilot frame interval is typically much shorter than a beacon interval, stations may use measurement pilot frames to detect whether there is an AP transmitting on the channel, to measure the channel quality (e.g., measure received signal strength), and to receive other information relating to the AP in a much shorter period of time, e.g., as compared to waiting for the next beacon on the channel. Thus, at least in some cases, measurement pilot frames may facilitate quicker roaming decisions and association to a new AP. The measurement pilot frame may contain much of the same information provided in a beacon or probe response, but the measurement pilot is shorter since it may not include some of the longer fields, such as all of the TIM and DTIM fields provided in the beacon. Measurement pilot frames may be received by a mobile station, for example, during active or passive scanning.

SUMMARY

Various embodiments are disclosed relating to use of a measurement pilot frame for radio measurement in a wireless network.

According to an example embodiment, a radio measurement request (e.g., beacon request or beacon measurement request) may be received from a requesting wireless node (e.g., an access point). A measurement pilot frame may be received from one or more wireless nodes (e.g., APs). A radio measurement report (e.g., beacon report) may be generated based, at least in part, on the measurement pilot frame from one or more wireless nodes. The radio measurement report (e.g., beacon report) may be transmitted to the requesting wireless node. According to an example embodiment, the radio measurement request may include a field specifying a measurement mode for radio measurement. The measurement mode may specify a mode of measurement, such as, for example: a passive mode (e.g., passive use of received beacons, probe responses, or measurement pilot frames to perform measurement), an active mode (e.g., using probe requests/probe responses, beacons, or measurement pilots), a beacon table mode, a passive measurement pilot mode (e.g., where measurement may be performed passively using only received measurement pilot frames), and any passive mode (where any passive technique may be selected), and an any mode (allowing any active or passive measurement technique to be selected to provide the requested beacon report).

According to another example embodiment, a beacon request may be received from a requesting wireless node, the beacon request including a field specifying at least one of a plurality of measurement modes for radio measurement. The plurality of measurement modes may include one or more modes allowing use of measurement pilot frames. One or more measurement pilot frames may be received from one or more wireless nodes. A beacon report may be generated according to the measurement mode specified in the beacon request. In response to the receiving the beacon request, the beacon report may be transmitted to the requesting node.

According to yet another example embodiment, a beacon request may be received from a requesting wireless node. One or more measurement pilot frames may be received from one or more wireless nodes. A beacon report may be generated based, at least in part, on the measurement pilot frames from one or more wireless nodes. The beacon report may be transmitted to the requesting wireless node.

According to yet another example embodiment, a radio measurement request may be transmitted to a wireless node. A radio measurement report may be received from the wireless node, the radio measurement report being generated based, at least in part, on a measurement pilot frame from one or more wireless nodes.

In another example embodiment, an apparatus is provided that includes a controller, a memory coupled to the controller, and a wireless transceiver coupled to the controller. The apparatus may be adapted to: receive a radio measurement request from a requesting wireless node, to receive a measurement pilot frame from one or more wireless nodes, to generate a radio measurement report based, at least in part, on the measurement pilot frame from one or more wireless nodes; and to transmit the radio measurement report to the requesting wireless node. In an example embodiment, the apparatus may comprise a mesh point or a wireless node in a wireless meshed network.

In another example embodiment, an apparatus is provided that includes a controller, a memory coupled to the controller, and a wireless transceiver coupled to the controller. The apparatus may be adapted to: transmit a radio measurement request to a wireless node, and receive a radio measurement report from the wireless node, the radio measurement report being generated based, at least in part, on a measurement pilot frame from one or more wireless nodes.

In another example embodiment, a computer program product for wireless communications is provided, the computer program product being tangibly embodied on a computer-readable medium. The computer program product may include executable code that, when executed, is configured to cause one or more processors to: receive a radio measurement request from a requesting wireless node, to receive a measurement pilot frame from one or more wireless nodes, to generate a radio measurement report based, at least in part, on the measurement pilot frame from one or more wireless nodes; and to transmit the radio measurement report to the requesting wireless node.

In another example embodiment, a computer program product for wireless communications is provided, the computer program product being tangibly embodied on a computer-readable medium. The computer program product may include executable code that, when executed, is configured to cause one or more processors to: transmit a radio measurement request to a wireless node, and receive a radio measurement report from the wireless node, the radio measurement report being generated based, at least in part, on a measurement pilot frame from one or more wireless nodes.

According to an example embodiment, by allowing a beacon report to be generated based on the measurement pilot, the beacon report may, in some cases, be generated more quickly and more efficiently as compared to generating this report based on beacons and probe requests/responses.

BRIEF DESCRIPTION OF THE DRAWINGS

FIG. 2 is a diagram illustrating a frame body for a measurement pilot frame according to an example embodiment.

FIG. 3 is a diagram of a measurement request field format for a beacon measurement request (e.g., beacon request) according to an example embodiment.

FIGS. 4a-4b are diagrams illustrating different measurement modes that may be specified in a beacon request according to example embodiments.

FIG. 5 is a diagram illustrating a measurement report field format for a beacon report according to an example embodiment.

DETAILED DESCRIPTION

Figure 1:
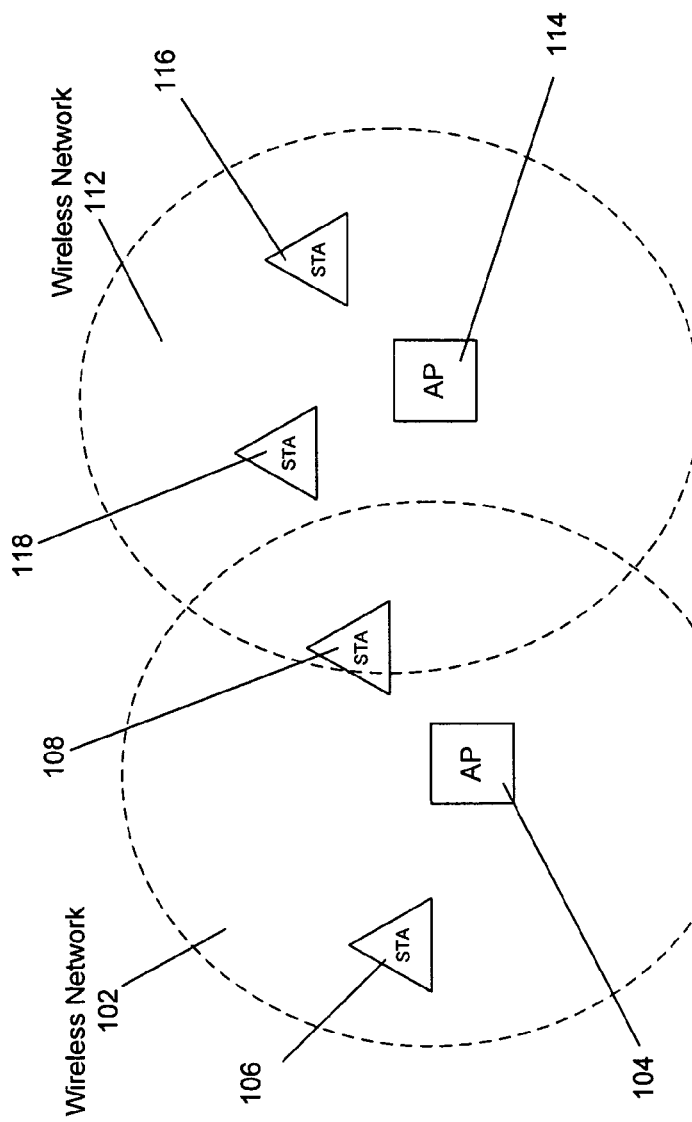
FIG. 1 is a diagram illustrating wireless networks according to an example embodiment.

Referring to the Figures in which like numerals indicate like elements, FIG. 1 is a diagram illustrating wireless networks 102 and 112 according to an example embodiment. According to an example embodiment, a wireless network, such as wireless network 102 and wireless network 112 may each include a number of wireless nodes, such as mobile stations, Access Points (APs), base stations, etc.

According to an example embodiment, each wireless network may include an Access Point (AP) and one or more mobile stations that may be in communication with the AP. For example, as shown in FIG. 1, wireless network 102 may include an AP 104 and several mobile stations that may be in communication with AP 104, such as mobile station 106 and mobile station 108. Similarly, wireless network 112 may include AP 114 and several mobile stations that may be in communication with AP 114, such as mobile station 116 and mobile station 118. Although not shown, AP 102 and AP 112 may be coupled to a fixed network.

The various embodiments described herein may be applicable to a wide variety of networks and technologies, such as WLAN networks (e.g., IEEE 802.11 type networks), cellular networks, radio networks, or other wireless or wired networks. In another example embodiment, the various examples and embodiments may be applied to a meshed wireless network, where a plurality of mesh points (e.g., Access Points) may be coupled together via wired or wireless links. The term "node" or "wireless node" or "network node" or "network station" may refer, for example, to a wireless station, e.g., a subscriber station or mobile station, an access point or base station, a relay station or other intermediate wireless node, or other wireless computing devices, such as laptop computers, desktop computers, and peripheral devices, as examples.

FIG. 2 is a diagram illustrating a frame body for a measurement pilot frame according to an example embodiment. For example, the measurement pilot may include: a timestamp—representing a value of a timing synchronization function (TSF) value of a pilot's source; measurement pilot interval—the transmission interval of measurement pilots; beacon interval—the beacon interval of the transmitting wireless node (e.g., AP); capability information—describes some capabilities of the transmitting node; Robust security network (RSN) capabilities—contains security related information (e.g., for authentication and ciphering); country string—providing country information; and a number of other fields, including max regulatory power, max transmit power, transmit power used, transceiver noise floor and DS (direct sequence) parameter set (a field which may be used if a direct sequence physical layer device (PHY) is used). Also, in a mesh network the packets similar to beacon or measurement pilot may be transmitted regularly. Those packets include information of the transmitting mesh point or the mesh network. These are just some example fields that may be included, and other fields may be used. For example, fields indicating vendor specific information may also be included.

A variety of different services or functions may be provided in a wireless (e.g., WLAN) network. These services, may include, for example, authentication (e.g., the process by which a mobile station may be authenticated by an AP), association (e.g., the process by which a mobile station may register with an AP), and other services.

Another service that may be performed by a network may include radio measurement (or radio resource measurement), which may include, for example: performing radio measurements, requesting and reporting of radio measurements, providing information about neighbor APs, and other functions related to radio measurements. For example, as part of radio measurement, a station may transmit different radio measurement requests to other stations for radio measurement information, e.g., radio measurement information for other (neighbor) APs. These radio measurement requests may include, for example, a beacon request (or beacon measurement request), although there may be many types of radio measurement requests. Typically, according to an example embodiment, a station receiving a radio measurement request from an AP or other station may generate and transmit an appropriate radio measurement report to the requesting station to provide the requested information. As described in greater detail below, according to an example embodiment, one or more of the different types of radio measurement reports (such as the beacon report) may be generated based on different sources of information, including beacons, probe responses and measurement pilots.

For example, a mobile station may receive a beacon request from its serving (associated) AP, which may be a request for beacon information of other (neighboring) APs. According to an example embodiment, the station receiving the beacon request may perform beacon measurement and/or generate a beacon report based on information received from other APs, such as beacons, beacon tables, probe responses and/or measurement pilot frames. Allowing beacon measurement (and beacon report generation) to be performed based on measurement pilot frames may, in some cases, allow for a more efficient and faster beacon measurement and beacon report generation (e.g., as compared to waiting for beacons or using probe requests/responses to measure beacons of other APs). The terms beacon request and beacon measurement request may be used interchangeably within this disclosure.

FIG. 3 is a diagram of a measurement request field format for a beacon measurement request (beacon request) according to an example embodiment. The measurement request field of a beacon request may include, for example: channel number—channel for which the measurement applies, and it may also be possible to request iterative measurements on all the channels; regulatory class—indicates the frequency band; randomization interval specifies an upper bound of the random delay to be used before the (beacon) measurement; measurement duration—may be set to a preferred or mandatory duration of the requested (beacon) measurement; measurement mode—indicates the measurement mode, e.g., to be used for the requested measurement (measurement mode is described in greater detail below with reference to FIGS. 4a-4b); BSSID—indicates the BSSID of the BSS for which a beacon report is requested. This may be a BSSID of an individual BSS, or may be a broadcast BSSID, e.g., where the station is requested to report on all BSSs on the specified channel; reporting condition may define when the measured results are to be reported to the requesting node, e.g., after each measurement, or when a value or average value of RCPI (received channel power indicator) or RSSI (received signal strength indicator) is above or below a particular threshold; threshold/offset and hysteresis may be used to specify reporting conditions, and may be used when there are repeated measurements; SSID (service set ID, not shown in FIG. 3) identifies the ESS (extended service set) which are to be measured, and a wildcard SSID may be specified to request measurement in all SSIDs. These are just some example fields that may be included, and other fields may be used.

According to an example embodiment, if a station that receives the beacon measurement request accepts the request (agrees to perform the requested beacon measurement), the measurement may be performed according to the measurement mode and the beacon report may be provided according to the reporting conditions.

FIG. 4a is a diagram illustrating different example measurement modes 400 that may be specified, for example, via a measurement mode field in a beacon request according to an example embodiment. For example, mode 0 (402) may indicate passive scanning (passive use of received beacons and received probe responses to perform measurement). Mode 1 may indicate active mode (404) of measurement, where measurement may be performed using active scanning—probe requests/probe responses. Mode 2 may indicate a beacon table mode (406). A node may typically have already generated and stored its beacon table based on earlier scanning (e.g., passive monitoring of beacons and/or passive monitoring of probe responses and/or active scanning). Thus, for beacon table mode, the node may transmit the beacon table it has stored, and typically does not perform additional measuring or additional report generation. The modes 0-2 described above to perform radio measurements, employing passive scanning, active scanning and beacon tables, are generally known techniques.

In addition to the modes 0-2 described above, several additional measurement modes may be provided, according to an example embodiment. For example, mode 3 may indicate a passive measurement pilot mode (408), where measurement may be performed passively using only received measurement pilots. Mode 4 may indicate any passive measurement 410 (e.g., passive measurement including passive monitoring of beacons, probe responses and measurement pilots). In mode 4, any of these passive techniques may be selected by the station receiving the beacon request. This may allow the station to select the mode that is the most convenient or easiest to obtain the requested measurement. Mode 5 (412) may indicate that any passive or active measurement technique may be used (e.g., passive monitoring of beacons, probe responses and measurement pilots and active scanning using probe requests/responses, or any combination thereof, possibly also beacon tables). In mode 5, any measurement technique may be selected by the station receiving the beacon request. In one embodiment, mode 5 may exclude beacon tables, while in another embodiment, mode 5 may include beacon tables.

In addition, according to an example embodiment, a beacon table may also be generated based upon monitoring of measurement pilots.

FIG. 4b is a diagram illustrating different example measurement modes 420 that may also be used, based on the previously discussed example modes. For example, as shown in FIG. 4b, three generalized measurement modes may be provided, some of which may be based on the type of scanning that is performed: a passive scanning mode 410, including use of beacons, probe responses, or measurement pilots; an active scanning mode 430, including use of probe requests and probe responses, beacons, or measurement pilots; and beacon tables 432, including use of stored beacon information (i.e., based on previous scanning information as discussed above).

The various measurement modes illustrated in FIGS. 4a-4b are merely examples, and a wide variety of different modes may be used. For example, there may be beacon or measurement pilot frame type of transmissions in mesh networks. An example measurement mode (e.g., mode 6) may be used to indicate in the beacon request that the beacon report may be created based on the reception of those packets. Those packets may also be used in generation of a beacon report if measurement is allowed with any passive measurement (e.g., mode 4) or any measurement technique (e.g., mode 5).

FIG. 5 is a diagram illustrating a measurement report field format 500 for a beacon report according to an example embodiment. The measurement report field of a beacon report may include, for example: channel number—channel on which the measurement is being performed; regulatory class—indicates the frequency band; actual measurement start time may indicate the time when the measurement was started; measurement duration may indicate the duration over which the beacon report was measured; PHY type may indicate the physical medium type of the station for the beacon or probe response or measurement pilot being reported; RCPI may indicate the received channel power of the beacon, or probe or measurement pilot and may be averaged over several beacons, probes or measurement pilots; BSSID—indicates the BSSID of the beacon or probe or measurement pilot being reported; parent TSF field—indicates the lower 4 octets of the measuring node's TSF (timing synchronization function) timer value at the time the reported beacon or probe response or measurement pilot was received; target TSF field—includes the TSF timestamp from the beacon or probe response or measurement pilot being reported; beacon interval—indicates the beacon interval from the reported beacon or probe response or measurement pilot; capability information—includes the capability information from the reported beacon, probe response or measurement beacon; received elements portion—may contain a number of information elements from the received beacon, probe response or measurement pilot, and TIM elements may be truncated, e.g., such that only the first 4 octets of the element are reported. These are just some example fields, and other fields may be used.

Figure 6:
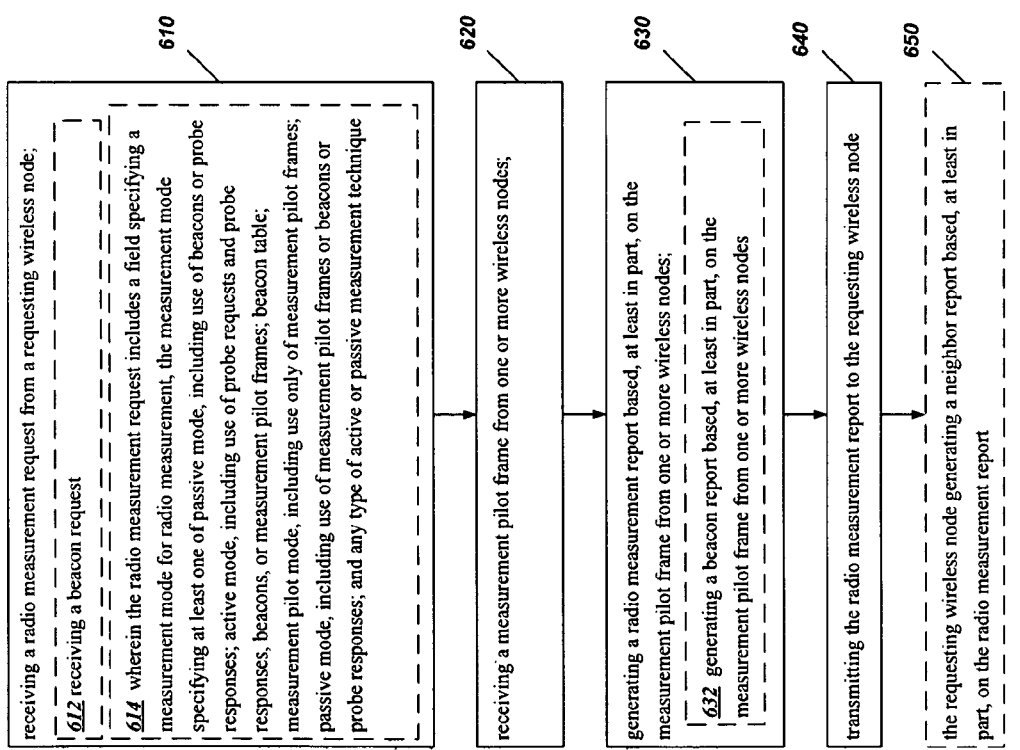
FIG. 6 is a flow chart illustrating operation of a wireless node according to an example embodiment.

FIG. 6 is a flow chart 600 illustrating operation of a wireless node according to an example embodiment. According to an example embodiment, at step 610 a radio measurement request may be received from a requesting wireless node (e.g., an AP).

According to an example embodiment, the radio measurement request may include a field specifying a measurement mode for radio measurement, the measurement mode specifying at least one of passive mode, including use of beacons or probe responses; active mode, including use of probe requests and probe responses, beacons, or measurement pilot frames; beacon table; measurement pilot mode, including use only of measurement pilot frames; passive mode, including use of measurement pilot frames or beacons or probe responses; and any type of active or passive measurement technique (614). For example, a beacon request including a measurement request field 300 that may include any measurement mode 400, 420 as shown in FIGS. 4a-4b, may be received, for example from AP 104.

At step 620, a measurement pilot frame may be received from one or more wireless nodes (e.g., APs). For example, a measurement pilot frame 200 may be received from the AP 104 or 114. At step 630, a radio measurement report may be generated based, at least in part, on the measurement pilot frame from one or more wireless nodes. For example, a beacon report may be generated (632). For example, the radio measurement report may be generated in accordance with the measurement report field format 500 discussed previously with regard to FIG. 5.

At step 640, the radio measurement report (e.g., beacon report) may be transmitted to the requesting wireless node. According to an example embodiment, the requesting wireless node may generate a neighbor report based, at least in part, on the radio measurement report (650).

Figure 7:
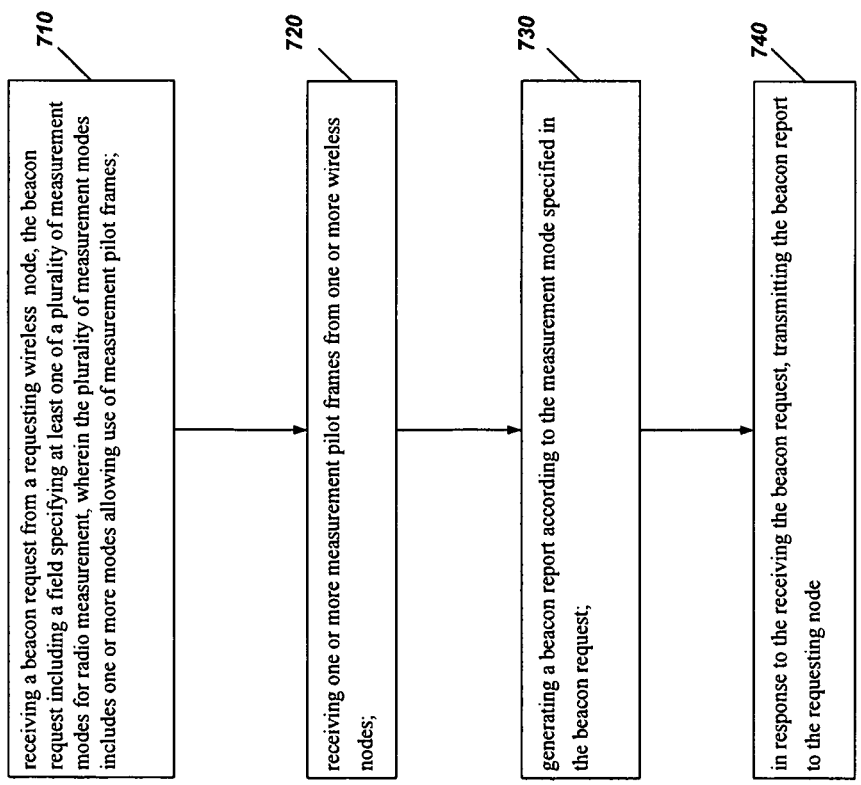
FIG. 7 is a flow chart illustrating operation of a wireless node according to another example embodiment.

FIG. 7 is a flow chart 700 illustrating operation of a wireless node according to another example embodiment. At step 710, a beacon request may be received from a requesting wireless node, the beacon request including a field specifying at least one of a plurality of measurement modes for radio measurement, wherein the plurality of measurement modes includes one or more modes allowing use of measurement pilot frames. For example, the measurement modes may include mode 0 (410), mode 1 (430), or mode 2 (432) of FIG. 4b as discussed previously. At step 720, one or more measurement pilot frames may be received from one or more wireless nodes.

At step 730, a beacon report may be generated according to the measurement mode specified in the beacon request. At step 740, in response to the receiving the beacon request, the beacon report may be transmitted to the requesting node.

Figure 8:
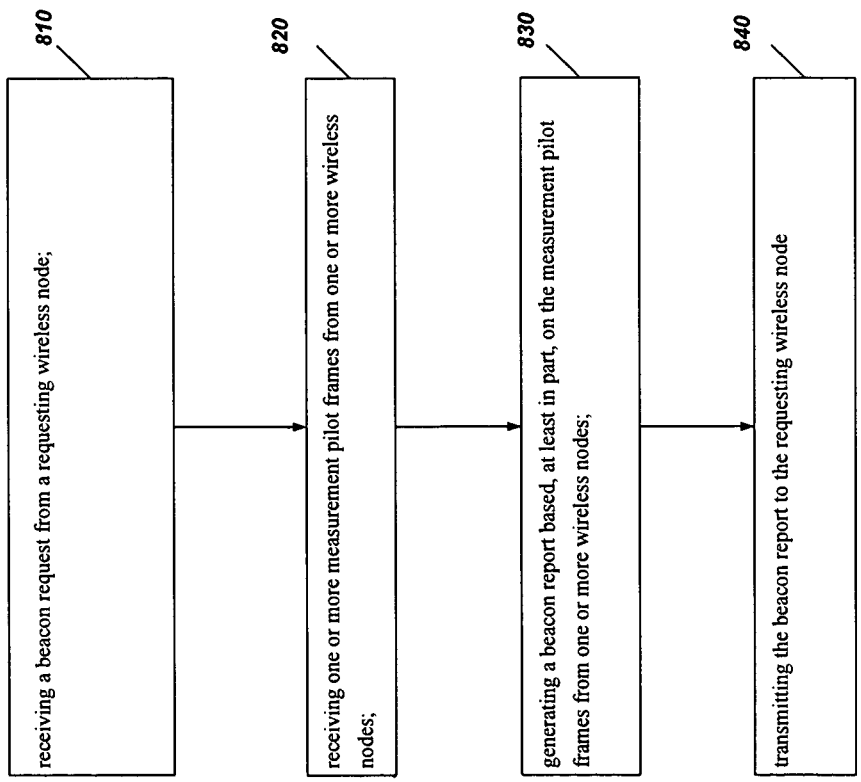
FIG. 8 is a flow chart illustrating operation of a wireless node according to another example embodiment.

FIG. 8 is a flow chart 800 illustrating operation of a wireless node according to another example embodiment. At step 810, a beacon request may be received from a requesting wireless node. At step 820, one or more measurement pilot frames may be received from one or more wireless nodes.

At step 830, a beacon report may be generated based, at least in part, on the measurement pilot frames from one or more wireless nodes. At step 840, the beacon report may be transmitted to the requesting wireless node.

Although the measurement pilot frame may provide information relating to an AP, the measurement pilot, according to an example embodiment, may not include all of the information provided in a beacon or probe response. This may make the measurement pilot shorter in length. However, the measurement pilot may include sufficient information (or substantially sufficient information) to allow a node to build or generate a neighbor report, which may provide information relating to one or more neighbor APs. Therefore, an AP may transmit a beacon measurement request, and may specify a measurement mode. The requesting AP may receive a beacon report, and may generate a neighbor report based on information provided in the beacon report. The AP may provide the neighbor report to other mobile stations, e.g., during association or upon request by the station. Therefore, allowing the beacon report to be measured and generated based upon measurement pilot frames not only may improve efficiency and time required to generate the beacon report, but may also improve the efficiency and time required to generate a neighbor report.

Figure 9:
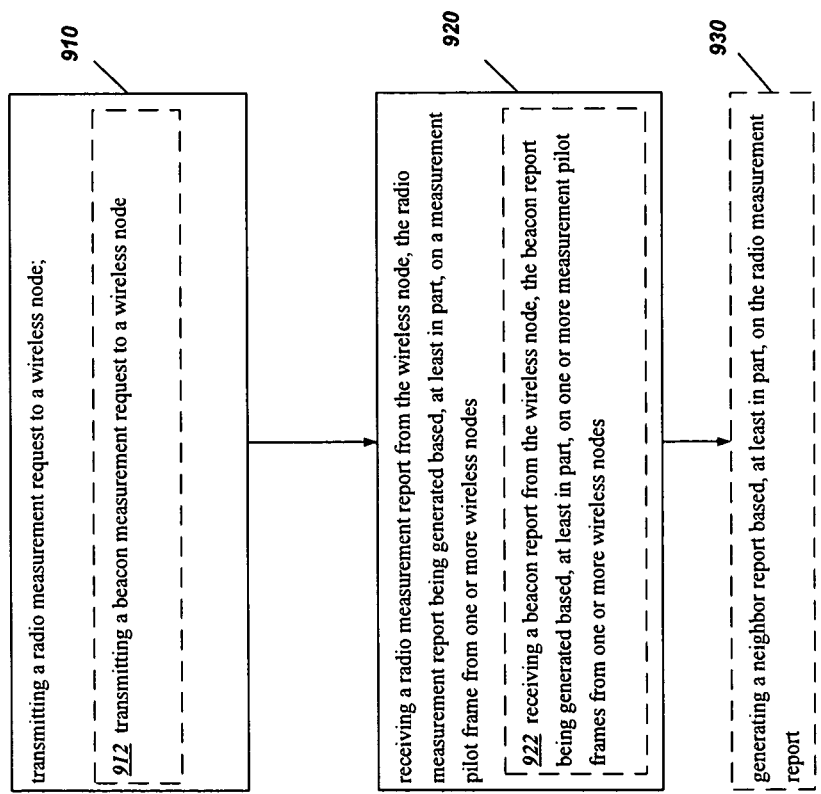
FIG. 9 is a flow chart illustrating operation of a wireless node according to another example embodiment.

FIG. 9 is a flow chart illustrating operation of a wireless node according to another example embodiment, in which a method of obtaining a radio measurement report in a wireless network may be provided. At step 910, a radio measurement request may be transmitted to a wireless node. For example, a beacon measurement request may be transmitted to the wireless node (912). At step 920, a radio measurement report may be received from the wireless node. The radio measurement report may be generated based, at least in part, on a measurement pilot frame from one or more wireless nodes. For example, a beacon report may be received from the wireless node, the beacon report being generated based, at least in part, on one or more measurement pilot frames from one or more wireless nodes (922). According to an example embodiment, a neighbor report may be generated based, at least in part, on the radio measurement report (930).

Figure 10:
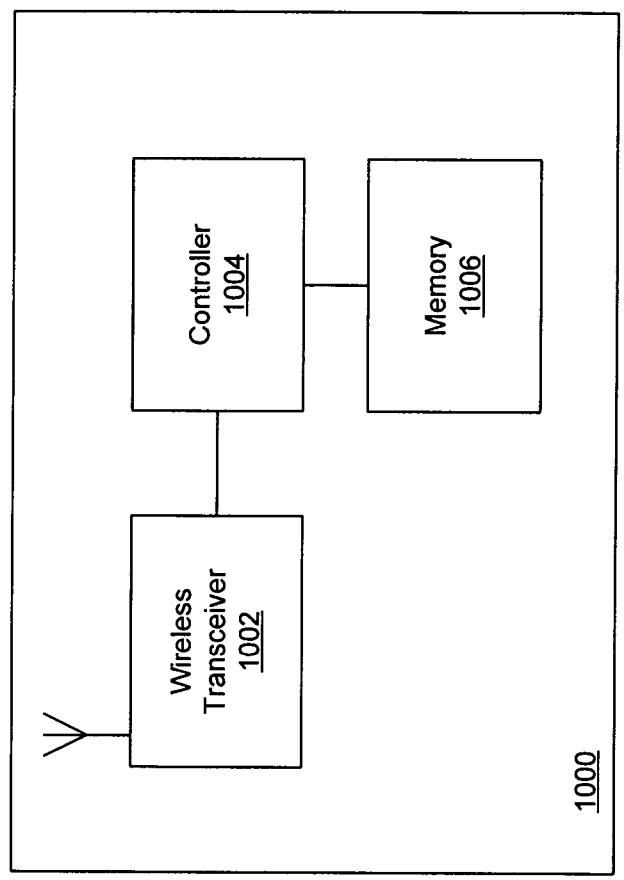
FIG. 10 is a block diagram illustrating an apparatus that may be provided in a wireless node according to an example embodiment.

As shown in FIG. 10, each node (e.g., mobile station or AP) may comprise an apparatus 1000 according to an example embodiment. The wireless station may include, for example, a wireless transceiver 1002 to transmit and receive signals, a processor or controller 1004 to control operation of the station and execute instructions or software, and a memory 1006 to store data and/or instructions. Each node may be programmed or adapted to perform the various functions or tasks described above. The controller 1004 may be programmable, and capable of executing software or other instructions stored in memory or on other computer media to perform the various tasks and functions described above. In addition, a storage medium or computer readable medium may be provided that includes stored instructions that, when executed by a controller or processor (e.g., the controller 1004) may result in the controller or processor performing one or more of the functions or tasks or services described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving a radio measurement request from a requesting wireless node;
receiving a measurement pilot frame from one or more wireless nodes;
generating a radio measurement report based, at least in part, on at least one of a beacon and a probe response, and the measurement pilot frame; and
transmitting the radio measurement report to the requesting wireless node.

2. The method of claim 1 wherein the receiving a radio measurement request comprises receiving a beacon request.

3. The method of claim 2 wherein the generating comprises generating a beacon report based, at least in part, on the measurement pilot frame from one or more wireless nodes.

4. The method of claim 1 and further comprising: the requesting wireless node generating a neighbor report based, at least in part, on the radio measurement report.

5. The method of claim 1 wherein the radio measurement request includes a field specifying a measurement mode for radio measurement, the measurement mode specifying at least one of the following:
passive mode, including use of beacons or probe responses;
active mode, including use of probe requests and probe responses, beacons, or measurement pilot frames;
beacon table;
measurement pilot mode, including use only of measurement pilot frames;
passive mode, including use of measurement pilot frames or beacons or probe responses; or
any type of active or passive measurement technique.

6. A method comprising:
receiving a beacon request from a requesting wireless node, the beacon request including a field specifying at least one of a plurality of measurement modes for radio measurement, wherein the plurality of measurement modes includes one or more modes allowing use of at least in part, on at least one of a beacon and a probe response, and measurement pilot frames;
receiving one or more measurement pilot frames from one or more wireless nodes;
generating a beacon report according to the measurement mode specified in the beacon request; and
in response to the receiving the beacon request, transmitting the beacon report to the requesting node.

7. A method comprising:
receiving a beacon request from a requesting wireless node;
receiving one or more measurement pilot frames from one or more wireless nodes;
generating a beacon report based, at least in part, on at least one of a beacon and a probe response, and the one or more measurement pilot frames; and transmitting the beacon report to the requesting wireless node.

8. A method of obtaining a radio measurement report in a wireless network comprising:
- transmitting a radio measurement request to a wireless node; and
- receiving a radio measurement report from the wireless node,
- the radio measurement report being generated based, at least in part, on at least one of a beacon and a probe response, and a measurement pilot frame.

9. The method of claim 8 wherein the transmitting a radio measurement request comprises transmitting a beacon measurement request to a wireless node.

10. The method of claim 8 wherein the receiving a radio measurement report comprises receiving a beacon report from the wireless node, the beacon report being generated based, at least in part, on one or more measurement pilot frames from one or more wireless nodes.

11. The method of claim 8 and further comprising: generating a neighbor report based, at least in part, on the radio measurement report.

12. An apparatus comprising:
- a controller; and
- a memory coupled to the controller and tangibly embodying a computer program;
- in which the memory with the computer program is configured to cause the apparatus to:
  - receive a radio measurement request from a requesting wireless node;
  - receive a measurement pilot frame from one or more wireless nodes;
  - generate a radio measurement report based, at least in part, on at least one of a beacon and a probe response, and the measurement pilot frame; and
  - transmit the radio measurement report to the requesting wireless node.

13. The apparatus of claim 12 wherein the memory with the computer program is configured to cause the apparatus to:
- receive a beacon measurement request from a requesting wireless node;
- generate a beacon report based, at least in part, on the measurement pilot frame from one or more wireless nodes; and
- transmit the beacon report to the requesting wireless node.

14. The apparatus of claim 12 wherein the apparatus comprises a mobile station in a wireless local area network (WLAN).

15. The apparatus of claim 14 wherein the apparatus comprises a mesh point or a wireless node in a wireless meshed network.

16. An apparatus comprising:
- a controller; and
- a memory coupled to the controller and tangibly embodying a computer program;
- in which the memory with the computer program is configured to cause the apparatus to:
  - transmit a radio measurement request to a wireless node; and
  - receive a radio measurement report from the wireless node,
- the radio measurement report being generated based, at least in part, on at least one of a beacon and a probe response.

17. The apparatus of claim 16 wherein the memory with the computer program is configured to cause the apparatus to:
- transmit a beacon measurement request to a wireless node; and
- receive a beacon report from the wireless node,
- the beacon report being generated based, at least in part, on the measurement pilot frame from one or more wireless nodes.

18. The apparatus of claim 16 wherein the apparatus comprises an access point (AP) or base station in a wireless local area network (WLAN).

19. The apparatus of claim 16 wherein the wireless node comprises a mesh point or wireless node in a wireless meshed network.

20. A computer program product for wireless communications, the computer program product being tangibly embodied on a computer-readable medium and including executable code that, when executed, is configured to cause one or more processors to:
- receive a radio measurement request from a requesting wireless node;
- receive a measurement pilot frame from one or more wireless nodes;
- generate a radio measurement report based, at least in part, on at least one of a beacon and a probe response, and the measurement pilot frame; and
- transmit the radio measurement report to the requesting wireless node.

21. A computer program product for wireless communications, the computer program product being tangibly embodied on a computer-readable medium and including executable code that, when executed, is configured to cause one or more processors to:
- transmit a radio measurement request to a wireless node; and
- receive a radio measurement report from the wireless node,
- the radio measurement report being generated based, at least in part, on and at least one of a beacon and a probe response, and a measurement pilot frame.

* * * * *